(12) United States Patent
Hull

(10) Patent No.: US 11,804,200 B2
(45) Date of Patent: Oct. 31, 2023

(54) SUBTRACTIVE COLOR CHANGE SYSTEM AND METHOD

(71) Applicant: NIKE, Inc., Beaverton, OR (US)

(72) Inventor: N. Scot Hull, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/968,100

(22) Filed: Oct. 18, 2022

(65) Prior Publication Data

US 2023/0108938 A1    Apr. 6, 2023

Related U.S. Application Data

(63) Continuation of application No. 16/374,772, filed on Apr. 4, 2019, now abandoned, which is a continuation
(Continued)

(51) Int. Cl.
| | |
|---|---|
| A43B 3/36 | (2022.01) |
| G09G 5/02 | (2006.01) |
| A43B 1/00 | (2006.01) |
| G02F 1/153 | (2006.01) |
| G02F 1/1516 | (2019.01) |

(52) U.S. Cl.
CPC ........... *G09G 5/026* (2013.01); *A43B 1/0027* (2013.01); *A43B 1/0036* (2013.01); *A43B 3/36* (2022.01); *G02F 1/1533* (2013.01); *G02F 1/15165* (2019.01); *G09G 2320/0666* (2013.01)

(58) Field of Classification Search
CPC ............ G09G 5/026; G09G 2320/0666; A43B 1/0027; A43B 1/0036; A43B 3/36; G02F 1/15165; G02F 1/1533
See application file for complete search history.

(56) References Cited

U.S. PATENT DOCUMENTS

| | | |
|---|---|---|
| 4,721,635 A | 1/1988 | Helinski |
| 4,749,260 A | 6/1988 | Yang et al. |
| | (Continued) | |

FOREIGN PATENT DOCUMENTS

| | | |
|---|---|---|
| CN | 2094234 | 1/1992 |
| CN | 101828785 | 9/2010 |
| | (Continued) | |

OTHER PUBLICATIONS

"U.S. Appl. No. 14/225,806, Appeal Decision mailed Feb. 4, 2019", 8 pgs.
(Continued)

*Primary Examiner* — Jitesh Patel
(74) *Attorney, Agent, or Firm* — Schwegman, Lundberg & Woessner, P.A.

(57) ABSTRACT

A subtractive color change system for displaying a selected color to a viewer and a method of changing color. The system includes a layered assembly having transparent panels of primary and key colors, with a fixed-color background behind the layered assembly. The subtractive color change system may have a control unit to individually control the intensities and values of the primary color panels to render a color and to control the intensities and values of the panels in the layered assembly to reduce differences between the color rendered and the selected color and to display the selected color to a viewer.

17 Claims, 7 Drawing Sheets

Related U.S. Application Data of application No. 14/225,806, filed on Mar. 26, 2014, now abandoned.

(56) References Cited

U.S. PATENT DOCUMENTS

| | | | |
|---|---|---|---|
| 4,953,953 | A | 9/1990 | Fergason |
| 5,438,649 | A | 8/1995 | Ruetz |
| 5,813,148 | A | 9/1998 | Guerra |
| 6,124,905 | A | 9/2000 | Ijima |
| 6,473,058 | B1 | 10/2002 | Hotomi et al. |
| 6,611,357 | B2 | 8/2003 | Wendt et al. |
| 6,890,715 | B1 | 5/2005 | Lewis et al. |
| 7,071,289 | B2 | 7/2006 | Sotzing et al. |
| 7,105,237 | B2 | 9/2006 | Sotzing |
| 7,118,692 | B2 | 10/2006 | Nordquist et al. |
| 7,125,479 | B2 | 10/2006 | Sotzing |
| 7,134,749 | B2 | 11/2006 | Ben-Zur et al. |
| 7,321,012 | B2 | 1/2008 | Sotzing |
| 7,332,223 | B2 | 2/2008 | Sotzing et al. |
| 7,432,340 | B2 | 10/2008 | Zahn et al. |
| 7,497,036 | B2 | 3/2009 | Rhodes-Vivour |
| 7,572,879 | B2 | 8/2009 | Zahn et al. |
| 7,586,663 | B1 | 9/2009 | Radmard et al. |
| 7,619,793 | B2 | 11/2009 | Tonami |
| 7,626,748 | B2 | 12/2009 | Radmard et al. |
| 7,737,247 | B2 | 6/2010 | Stotzing |
| 7,746,533 | B2 | 6/2010 | Sotzing et al. |
| 7,951,902 | B2 | 5/2011 | Sotzing |
| 2004/0184390 | A1* | 9/2004 | Oishi ............... G11B 7/26 |
| 2005/0036077 | A1 | 2/2005 | Khan et al. |
| 2005/0137542 | A1 | 6/2005 | Underhill et al. |
| 2005/0270619 | A1* | 12/2005 | Johnson ............ G02F 1/163 |
| | | | 359/265 |
| 2006/0198971 | A1 | 9/2006 | Obonai et al. |
| 2007/0089845 | A1 | 4/2007 | Sotzing et al. |
| 2007/0127075 | A1 | 6/2007 | Inoue |
| 2007/0191576 | A1 | 8/2007 | Sotzing |
| 2008/0297030 | A1 | 12/2008 | Zhang et al. |
| 2009/0027577 | A1 | 1/2009 | Nose |
| 2009/0027755 | A1 | 1/2009 | Stellbrink et al. |
| 2009/0277056 | A1 | 11/2009 | Peeters et al. |
| 2009/0311799 | A1 | 12/2009 | Sotzing et al. |
| 2009/0316253 | A1 | 12/2009 | Fairley et al. |
| 2009/0326187 | A1 | 12/2009 | Sotzing |
| 2010/0097658 | A1 | 4/2010 | Kerz |
| 2010/0225853 | A1 | 9/2010 | Wang et al. |
| 2010/0245971 | A1 | 9/2010 | Sotzing et al. |
| 2010/0288343 | A1 | 11/2010 | Sotzing et al. |
| 2011/0168951 | A1 | 7/2011 | Sotzing |
| 2011/0201826 | A1 | 8/2011 | Sotzing |
| 2011/0233532 | A1 | 9/2011 | Sotzing et al. |
| 2011/0260961 | A1 | 10/2011 | Burdis |
| 2012/0139825 | A1 | 6/2012 | Yashiro et al. |
| 2012/0169975 | A1 | 7/2012 | Okumoto et al. |
| 2012/0194934 | A1 | 8/2012 | Kitson et al. |
| 2012/0199222 | A1* | 8/2012 | Sullivan ............ A43B 23/24 |
| | | | 137/561 R |
| 2012/0223905 | A1 | 9/2012 | Jeon et al. |
| 2013/0033378 | A1* | 2/2013 | Donovan .............. G02F 1/155 |
| | | | 340/540 |
| 2013/0033531 | A1 | 2/2013 | Kim et al. |
| 2015/0279320 | A1 | 10/2015 | Hull |
| 2020/0005730 | A1 | 1/2020 | Hull |

FOREIGN PATENT DOCUMENTS

| | | |
|---|---|---|
| CN | 102369478 | 3/2012 |
| CN | 203250096 | 10/2013 |
| CN | 106132229 | 11/2016 |
| CN | 106132229 | 2/2018 |
| CN | 108354257 | 8/2018 |
| CN | 108354257 | 11/2022 |
| EP | 3094201 | 11/2016 |
| EP | 3094201 | 4/2020 |
| JP | H11146189 | 5/1999 |
| WO | 2015147994 | 10/2015 |
| WO | 2015147994 | 1/2016 |

OTHER PUBLICATIONS

"International Application Serial No. PCT US2015 014755, International Search Report dated May 11, 2015", 4 pgs.
"International Application Serial No. PCT US2015 014755, Written Opinion dated May 11, 2015", 8 pgs.
"International Application Serial No. PCT US2015 014755, International Preliminary Report on Patentability dated Oct. 6, 2016", 10 pgs.
"U.S. Appl. No. 14/225,806, Non Final Office Action dated Apr. 13, 2016", 18 pgs.
"U.S. Appl. No. 14/225,806, Response filed Jul. 13, 2016 to Non Final Office Action dated Apr. 13, 2016", 12 pgs.
"U.S. Appl. No. 14/225,806, Final Office Action dated Oct. 5, 2016", 21 pgs.
"U.S. Appl. No. 14/225,806, Response filed Feb. 6, 2017 to Final Office Action dated Oct. 5, 2016", 11 pgs.
"U.S. Appl. No. 14/225,806, Advisory Action dated Mar. 14, 2017", 4 pgs.
"U.S. Appl. No. 14/225,806, Pre-Appeal Brief Request for Review filed Apr. 5, 2017", 6 pgs.
"U.S. Appl. No. 14/225,806, Decision on Pre-Appeal Brief Request mailed Apr. 18, 2017", 2 pgs.
"U.S. Appl. No. 14/225,806, Appeal Brief filed Jun. 5, 2017", 24 pgs.
"U.S. Appl. No. 14/225,806, Examiner's Answer to Appeal Brief mailed Dec. 28, 2017", 25 pgs.
"U.S. Appl. No. 14/225,806, Reply Brief filed Feb. 28, 2018", 12 pgs.
"European Application Serial No. 15706323.1, Response filed Apr. 4, 2017 to Communication Pursuant to Rules 161(1) and 162 EPC dated Sep. 30, 2016", 14 pgs.
"European Application Serial No. 15706323.1, Communication pursuant to Article 94(3) EPC dated Sep. 11, 2018", 10 pgs.
"European Application Serial No. 15706323.1, Response filed Dec. 21, 2018 to Communication pursuant to Article 94(3) EPC dated Sep. 11, 2018", 15 pgs.
"U.S. Appl. No. 16/374,772, Preliminary Amendment filed Sep. 19, 2019", 6 pgs.
"U.S. Appl. No. 16/374,772, Non Final Office Action dated Oct. 31, 2019", 20 pgs.
"U.S. Appl. No. 16/374,772, Response filed Jan. 31, 2020 to Non Final Office Action dated Oct. 31, 2019", 8 pgs.
"U.S. Appl. No. 16/374,772, Final Office Action dated Apr. 16, 2020", 27 pgs.
"Chinese Application Serial No. 201810058432.6, Office Action dated Mar. 13, 2020", w English translation, 36 pgs.
"U.S. Appl. No. 16/374,772, Examiner Interview Summary dated Apr. 27, 2020", 3 pgs.
"U.S. Appl. No. 16/374,772, Response filed Jun. 16, 2020 to Final Office Action dated Apr. 16, 2020", 9 pgs.
"U.S. Appl. No. 16/374,772, Advisory Action dated Jun. 30, 2020", 3 pgs.
"Chinese Application Serial No. 201810058432.6, Response filed Jul. 13, 2020 to Office Action dated Mar. 13, 2020", w current English claims, claims not amended in response filed, 12 pgs.
"U.S. Appl. No. 16/374,772, Non Final Office Action dated Aug. 6, 2020", 26 pgs.
"U.S. Appl. No. 16/374,772, Examiner Interview Summary dated Sep. 14, 2020", 3 pgs.
"Chinese Application Serial No. 201810058432.6, Office Action dated Oct. 20, 2020", With English translation, 31 pgs.
"U.S. Appl. No. 16/374,772, Appeal Brief filed Feb. 16, 2021", 23 pgs.
"U.S. Appl. No. 16/374,772, Examiner's Answer dated Mar. 19, 2021", 14 pgs.

(56) References Cited

OTHER PUBLICATIONS

"Chinese Application Serial No. 201810058432.6, Response filed Feb. 22, 2021 to Office Action dated Oct. 20, 2020", w English Claims, 30 pgs.

"Chinese Application Serial No. 201810058432.6, Decision of Rejection dated Jun. 2, 2021", With English machine translation, 35 pgs.

"Chinese Application Serial No. 201810058432.6, Response filed Sep. 17, 2021 to Decision of Rejection dated Jun. 2, 2021", w English claims, 22 pgs.

"Chinese Application Serial No. 201810058432.6, Office Action dated Jan. 10, 2022", With English translation, 32 pgs.

"Chinese Application Serial No. 201810058432.6, Response filed May 25, 2022 to Office Action dated Jan. 10, 2022", w English claims, 21 pgs.

"U.S. Appl. No. 16/374,772, Appeal Decision mailed Aug. 18, 2022", 14 pgs.

"Chinese Application Serial No. 201810058432.6, Response to Examiner Telephone Interview filed Aug. 19, 2022", w English claims, 11 pgs.

U.S. Appl. No. 14/225,806, filed Mar. 26, 2014, Subtractive Color Change System and Method.

U.S. Appl. No. 16/374,772, filed Apr. 4, 2019, Subtractive Color Change System and Method.

* cited by examiner

SUBTRACTIVE COLOR CHANGE SYSTEM AND METHOD

BACKGROUND

The present disclosure relates generally to subtractive color change, and in particular relates to a subtractive color change system. The disclosure also relates to a method for improving color rendering in a subtractive color change system. The system is suitably used with a variety of devices and in various circumstances.

Color change systems are systems including devices that change color on demand. Color change systems may be monochromatic or polychromatic.

Display devices such as televisions, computer screens, navigation aids, especially GPS devices, and cellular telephones are devices that change on demand. Many electronic devices have a screen that changes color on demand to exhibit text, such as a telephone number, the result of a calculation, or the number of photographs taken. Some devices, such as digital cameras, may have more than one color change system.

Color change systems also are used on sporting equipment to show loyalty to a team by displaying the team colors, for example, and equipment adapted to indicate level or degree of performance. Color change systems also may be present on clothing and footwear, including many types of shoes and boots, magazines and newspapers, and the like.

Color change systems also include systems in which light is projected onto a surface. In such a system, light of different colors may be projected in different combinations to illuminate a surface with the colors of the light and with combinations of the colors of the lights to yield other colors.

Thus, color change systems are popular and often used. However, limitations on color change systems preclude their use under many circumstances. For example, many color change systems are heavy and rigid, and require extensive controlling systems. Some color change system include a glass or other rigid surface prone to damage, such as crazing, cracking, and breaking. Some systems require a light source in addition to ambient light. The faults of such systems limit use of the systems in a variety of applications, such as on clothing, shoes, or equipment, in magazines, and the like.

Therefore, there exists a need in the art for a color change system that is light, flexible, not prone to damage, and does not require extensive control systems or a light source in addition to ambient light.

SUMMARY

In one aspect, the disclosure provides a subtractive color change system for displaying a selected color to a viewer. The subtractive color change system includes a color change portion. The color change portion may include a layered assembly comprising a first transparent panel of a first primary color, a second transparent panel of a second primary color, a third transparent panel of a third primary color, and a fourth transparent panel of a key color. A fixed-color background is anterior to the layered assembly. The background may exhibit the key color, in which case the fourth transparent panel need not be present. The subtractive color change system also may include a control unit to individually control the intensities and values of the primary color panels to render a color and to control the intensities and values of the panels in the layered assembly to reduce differences between the color rendered and the selected color and to display the selected color to a viewer.

In another aspect, the disclosure provides a method for displaying to a viewer a selected color in a subtractive color change system having a first transparent panel of a first primary color, a second transparent panel of a second primary color, a third transparent panel of a third primary color, a fourth transparent panel of a key color, a background of a fixed color anterior of the panels, and a control unit. The background may exhibit the key color, in which case the fourth transparent panel need not be present. In accordance with the method, an intensity and a value of each primary color panel required to render a selected color is predicted. The intensities and values of the primary color panels are adjusted to the predicted intensities and values to render a color. Differences between the selected color and the rendered color are determined, and at least one of the intensity and the value of at least one transparent panel is controlled to reduce differences and to display the selected color to the viewer.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
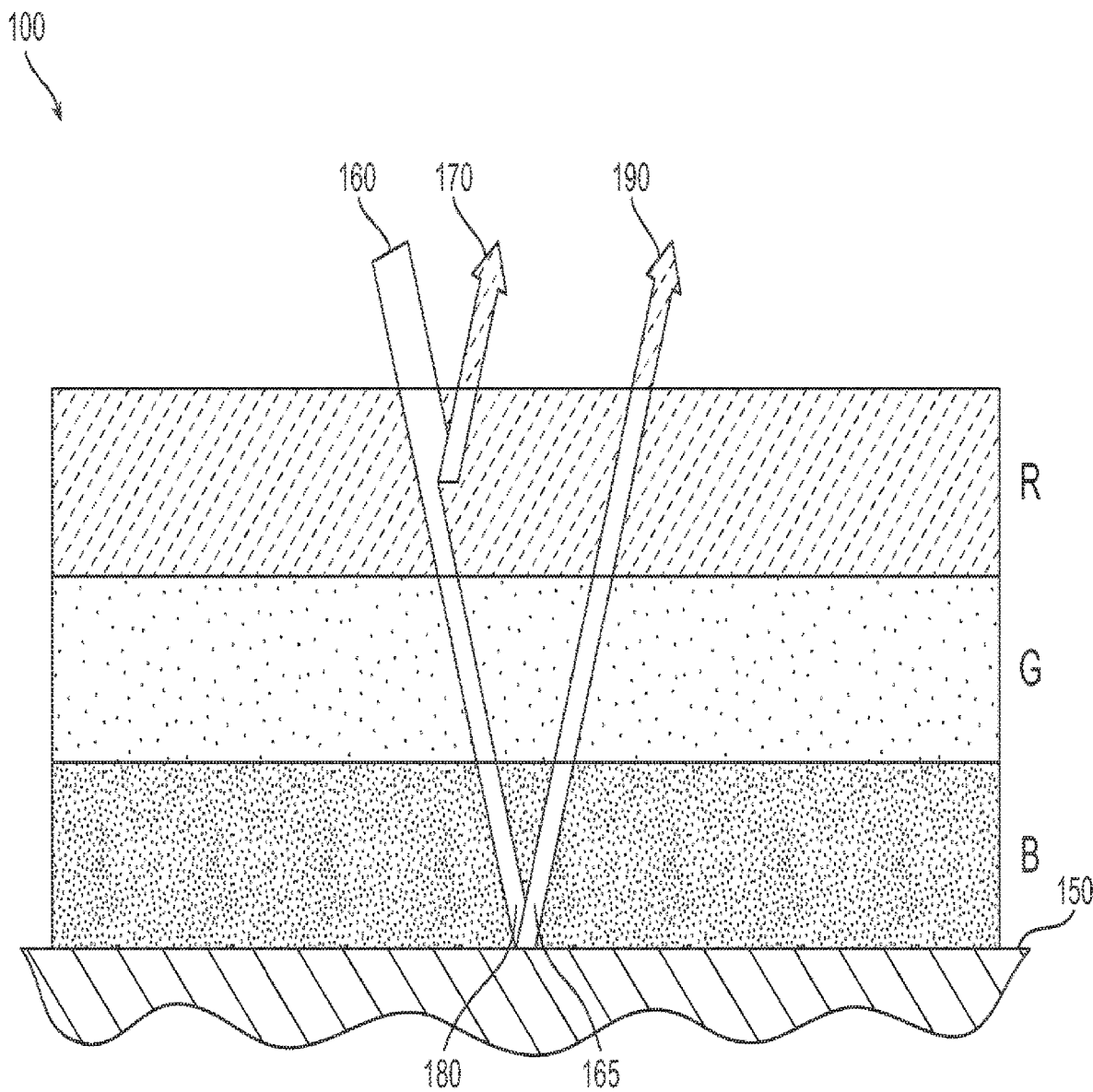
FIG. 1 is a schematic diagram of a subtractive color change system that may be an embodiment of this disclosure that exhibits red color.

The skilled practitioner recognizes that the vocabulary of color is confused and confusing. Some of this confusion appears to be related to the difference between additive color models, i.e., models based on light mixtures, and subtractive color models, based on the behavior of paints, inks, films and transparencies, dyes, and pigment mixtures. Further, color perception by humans is both somewhat subjective and based on stimulation of the rods and cones of the eye, i.e., additive principles.

The skilled practitioner further recognizes that color typically is described by defining three characteristics. For example, the HSB model characterizes color in terms of hue, saturation, and brightness. Typically, hue is described as the name of a color, saturation refers to the purity or intensity of a color, and brightness refers to the lightness or darkness of a color. Other models, used typically in computer vision applications, include the HSL (hue, saturation, and lightness), HSV (hue, saturation, and value), and HSI (hue, saturation, and intensity). These models thus relate more closely to additive color systems.

Color models, also known as color spaces, typically are based on three primary colors and blends thereof. For example, one of the more common additive color models is the RGB model or color space, wherein red, green, and blue are the primary colors. This model is, in part, based on early understanding of color reception in the human eye.

Primary colors are the colors upon which the color space is based. The entirety of the colors formed by mixing the three primary colors is known as the gamut. The skilled practitioner recognizes that the combination of red, green, and blue lights yield white. Indeed, the combination of primary colors in an additive system typically yields white. However, in subtractive color spaces, mixing the primary colors typically yields a dark color. However, this dark color typically is a muddy color close to black but typically unsatisfactory to a sophisticated or demanding user. Further, primary colors may be selected to be sufficient to display a limited gamut.

Typically, the primary colors in a subtractive color space are cyan, magenta, and yellow. This color model is known as the CMY model. Some subtractive color spaces sometimes are called "four color." Such a color space typically is identified with the abbreviation CMYK for the first letter of the typically-used three primary colors and a fourth color, also known as the key color. In some color spaces, such as in printing, the key color was the color of the key plate in the printing system, i.e., the plate used to align each of the other individual plates used to print one primary color. In some systems, the 'K' is used to represent black. However, 'K' more properly may be recognized as a key color, i.e., a color that is not one of the three primary colors.

In a subtractive color space, black is popularly used as a key color to form a rich, satisfying black that replaces the muddy color that often results from blending the three primary colors. Further, using a blend of the three primary colors to obtain this unsatisfactory color requires a large quantity of colored media, such as inks, watercolor paints, or laser printer toners. The inks and watercolors often soak the substrate, yielding an unsatisfactory color and an unsatisfactory physical appearance. In laser printing, the resultant dark color from combination is not only expensive, but also unsatisfactory to users expecting to see sharp, rich blacks. Hence, for example, many modern laser printers use "four color," viz., cyan, magenta, yellow, and black.

Although the three primary colors used in subtractive color models or color spaces are cyan, magenta, and yellow, three other primary colors may be selected. For example, orange, green, and violet form a set of subtractive primary colors, and red, yellow, and blue form another set of primary colors used in subtractive color change systems.

Some subtractive color models use more than four colors. For example, a printing process known as "Hexachrome" added orange and green to cyan, magenta, yellow, and black (CMYKOG). Addition of orange and green broadened the gamut and allowed for more accurate reproduction of skin tones and pastels.

Thus, it can be seen that subtractive color change systems are not perfect color models or color spaces. This circumstance is illustrated in particular by the typical failure of the combination of the three subtractive primary colors to yield a rich, satisfying black. Some of these imperfections may be introduced by failure of the primary color media to faithfully reproduce the primary colors. It may be possible to correct a color rendered in a subtractive color change system to minimize differences between the rendered color and the target color. In particular, judicious selection of a key color, optionally in conjunction with adjustments to the primary colors themselves, may reduce differences between a color rendered by a subtractive color change system and the target color.

For convenience and ease of description in the disclosure herein, 'primary color' means one of the three colors upon which the color space is based. 'Key color' means a non-primary non-black color that may be used in a subtractive color space to reduce errors in color rendition resulting from all other colors used in the color space. 'Color' means the hue. Color may be perceived subjectively, as by a viewer, or it may be measured, quantified, or otherwise characterized objectively, as by an instrument such as by spectrophotometry. 'Intensity' means the saturation or purity of a color. 'Value' means the brightness or relative lightness or darkness of a color.

Embodiments of a subtractive color change system disclosed herein relate to a color model or a color space in which transparent panels are used to change the color of light reflected from a fixed-color, typically white, background. In some embodiments, the background panel may exhibit a key color. Each of three of the panels reproduces a primary color, and the fourth panel reproduces a key color. In embodiments of the disclosure, the background may be light-colored. In some embodiments of the disclosure, the background may be white. In some embodiments, the background may exhibit a key color and the fourth panel is not present.

For convenience and clarity of disclosure herein, the subtractive color change system disclosed herein will be described with regard to the RGBK model or color space, wherein 'K' is a non-black key color. However, it should be understood that the disclosure encompasses any subtractive color change system utilizing at least three primary colors and a key color.

Embodiments of the disclosure provide a subtractive color change system for displaying a selected color to a viewer. The subtractive color change system may include a layered assembly comprising a first transparent panel of a first primary color, a second transparent panel of a second primary color, a third transparent panel of a third primary color, and a fourth transparent panel of a key color. A fixed-color background is anterior to the layered assembly. In some embodiments, the key color may be found on the background panel instead of in a fourth transparent panel. The subtractive color change system also includes a control unit to individually control the intensities and values of the primary color panels to render a color and to control the intensities and values of the panels in the layered assembly to correct differences between the color rendered and the selected color and to display the selected color to a viewer.

In other embodiments, the disclosure provides a method for displaying to a viewer a selected color in a subtractive color change system having a first transparent panel of a first primary color, a second transparent panel of a second primary color, a third transparent panel of a third primary color, a fourth transparent panel of a key color, a background of a fixed color anterior of the panels, and a control unit. If the background color is the key color, the fourth transparent panel need not be present. In accordance with the method, an intensity and a value of each primary color panel required to render a selected color is predicted. The intensities and values of the primary color panels are adjusted to the predicted intensities and values to render a color. Differences between the selected color and the rendered color are determined, and at least one of the intensity and the value of at least one transparent panel is controlled to reduce differences and to display the selected color to the viewer.

In other embodiments, the disclosure provides for the method wherein the intensity and value of the key color panel is controlled to correct for the differences and to display the selected color to the viewer.

The inventors have discovered that some differences between selected colors and colors displayed in subtractive color rendition by transparent panels can be corrected by using a key color. Such differences may be introduced, inter alia, by the way color is rendered in a subtractive color space, by the reflectivity of the transparent panels, by imperfect transparency of those panels, by imperfect color rendition, by imperfect selection of the primary colors, by changes to light incident on some transparent panels after the light has passed through at least one of the transparent panels, and by other properties and characteristics of such panels.

As the skilled practitioner recognizes, the human eye contains only three types of cone cells that contribute to color vision. Each type of cone responds to a defined spectrum of wavelengths. The sensation of color thus is the result of the combination of the cumulative stimulus these three types of cone cells receives, sometimes called tristimulus values. Thus, different combinations of wavelengths can produce equivalent cone response (same tristimulus values), and thus equivalent color sensation. This phenomenon is known as metamerism.

The skilled practitioner recognizes that color sensation is related to the properties and characteristics of both the subtractive color change system and of the light source illuminating the system. Thus, two materials may match under one type of light, but not under another. Similarly, the properties and characteristics other than the hue, intensity, or value of the materials used to form the subtractive color space typically are not considered in color matching. Nonetheless, these properties and characteristics, including, for example, transparency, gloss, and surface texture, may affect perception of the color rendered, and therefore cannot be ignored by a viewer of a subtractive color change system. A user therefore may seek to adjust the color rendered, even if the color rendered is a technically sound or objectively correct representation of the color sought.

In a subtractive color space, color blending typically is not precise, not only for the reasons set forth above, but also because of the subjective nature of color perception. In accordance with embodiments of the disclosure, differences between the selected color and the rendered color are reduced and the selected color is displayed to the viewer.

Differences between the color rendered by a subtractive color space and the intended color can be identified, determined, or quantified by a direct comparison of the colors. For the purposes of this disclosure, 'identified,' 'determined,' and 'quantified' are terms that, when related to comparison of a rendered color and an intended color for the purpose of adjustment of the rendered color to bring it closer to the intended color, may be used interchangeably. The degree of precision or amount of information obtained in the comparison may increase as one progresses from 'identifying' a difference through 'determination' to 'quantification.' For example, 'identification' can be as simple as a subjective evaluation that the two colors are different, 'determination' may involve simple measurements and use of a comparator, for example, and 'quantification' may involve detailed evaluation of, for example, differences of hue/color, intensity, and value between the colors. However, for simplicity and convenience herein, the terms are used interchangeably, unless the context clearly indicates otherwise.

In embodiments of the disclosure, comparison of the rendered color to the selected, targeted, or intended color may be done subjectively. Subjective comparison of a rendered color with an intended color can be done by a casual evaluator or by a sophisticated evaluator. For example, most viewers are capable of recognizing differences between colors, many viewers are capable of recognizing subtle differences between colors, and trained evaluators are proficient at recognizing very subtle differences between colors. A viewer may prefer to match a color, such as a team color, in a manner pleasing to that consumer, even though the resultant rendered color is different from the intended color. Subjective color differences also may exist from viewer to viewer. However, typically, a consumer is able to identify subtle differences between at least one of the color, intensity, or value of the rendered color as compared with the intended color.

Although color perception by an individual is necessarily subjective, customer satisfaction may be a primary driving force toward adjusting the rendered color and reducing differences to suit a customer preference.

In other embodiments of the disclosure, color differences may be determined objectively, for example, with a color comparator, a differential color analyzer, or a spectrophotometer. A color comparator is an instrument that compares an unknown color (i.e., the color rendered) with a standard color sample (i.e., the target color). Spectrophotometers identify wavelengths. Color analyzers may yield quantitative color information, typically including intensity and value. A color analyzer might yield information on the wavelengths, intensity, and value of a color as a function of the three primary wavelengths. These and other suitable comparator-type instruments are known to the skilled practitioner and can be used to evaluate colors in accordance with the disclosure.

In still other embodiments of the disclosure, it may be possible to predict errors that will arise between a rendered color and a target color. For example, a viewer who seeks to copy a color from a computer monitor, cell phone screen, or other device using an RGB additive color space to a subtractive color space often will encounter a different gamut. Therefore, the color seen in the additive color space may not be in the gamut of the subtractive color change system. For such a circumstance, it is possible to predict not only that an error will occur but also the magnitude of the error. Similarly, the skilled practitioner recognizes that errors may be introduced by phenomena such as the Abney effect, i.e., the tendency of the color to change with addition of white in a subtractive color space, even though addition of white (for example, by a background) should reduce intensity but not change the color. These and other errors can be predicted and, in accordance with embodiments disclosed herein, the subtractive color change system may be operated to minimize the errors.

Other errors in color rendition may be introduced by a subtractive color space. For example, the primary colors utilized may not be perfect renditions. In embodiments of the disclosure, the subtractive color change system may be adjusted to render a color more faithfully than a flawed subtractive color space using imperfect materials.

In embodiments of the disclosure, the subtractive color change system may include a layered assembly having four different transparent sheets, including three primary colors and one other (key) color. These four layers may be assembled with a fixed color background. The background may be a light color or white. White may be used to maximize reflected light while minimizing introduction of color by the background.

In some embodiments of the disclosure, the fixed-color background may be reflective or fluorescent. The skilled practitioner recognizes that reflectance may be achieved in a number of ways, such as a glossy surface or a mirrored surface. In some embodiments, the reflective or fluorescent background may include a key color.

In some embodiments of the disclosure, fluorescence may suitably be used to enhance or correct the color rendered by the primary and key color layers. As the skilled practitioner recognizes, fluorescence is the emission of light by a material exposed to light or another electromagnetic radiation. Typically, the emitted light has a longer wavelength than the incident radiation. For example, incident ultraviolet radiation may induce fluorescence in the visible wavelengths.

In other embodiments of the disclosure, 'resonance fluorescence,' i.e., the wavelength of light rendered is the same wavelength of the incident light, may be used. In still other embodiments of the disclosure, intense incident radiation may induce fluorescence of shorter wavelength because the fluorescing material adsorbs about twice the energy. With the guidance provided herein, the user can identify and employ fluorescence without undue experimentation.

In embodiments of the disclosure, fluorescence also may be used in the key color layer of the subtractive color change system. The ability to adjust the intensity and value of a fluorescent response may be particularly useful in correcting differences between a rendered color and a selected or target color. In particular, fluorescence may provide a particularly vivid addition to the color rendered by the subtractive color change system.

Fluorescence may be used to render a variety of colors in embodiments of the disclosure. For example, fluorescent blues, pinks and reds, yellows, and other colors are known.

In some embodiments of the disclosure, the primary color panels may model the RGB color space. In some embodiments of the disclosure, the primary color panels may model the CMY color space. In other embodiments of the disclosure, the primary color panels may model the GOV color space. In other embodiments of the disclosure, the primary colors of another subtractive color space are used. In some embodiments of the disclosure, the primary colors of the color space may not be perfect primary colors, but form a color space that has a gamut sufficient to render colors sufficient for the purpose and intended use of the subtractive color change system. For example, a color space that includes only greens, blues, and reds in the gamut may be sufficient for sports equipment and related items that are intended to be able to render only these colors and combinations thereof.

FIG. 1 is a schematic diagram of an embodiment of a color change portion of a subtractive color change system as disclosed herein. In FIG. 1, the transparency of each color panel to the primary color of the panel is 50 percent, and the transparency of each color panel to color other than the primary color of the panel is essentially 100 percent. As illustrated in FIG. 1, a color change portion 100 of a subtractive color change system includes color panel R, color panel G, color panel B, and background 150. Color panel R exhibits red color, color panel G exhibits green color, and color panel B exhibits blue color.

FIG. 1 illustrates an embodiment of a color change portion 100 of a subtractive color change system that exhibits the color red. Light 160 has a relatively full spectrum. Light 160 is incident upon color panel R, where first reflected light 170 exhibits red color and first residual light 180 passes through color panel R, is neither absorbed nor reflected by color panel G or color panel B. First reflected residual light 165 reflects from background 150, again passing through both color panel B and color panel G. As first reflected residual light 165 passes back through color panel R and exits as second reflected residual light 190, it reinforces the red color exhibited by first reflected light 170.

Figure 2:
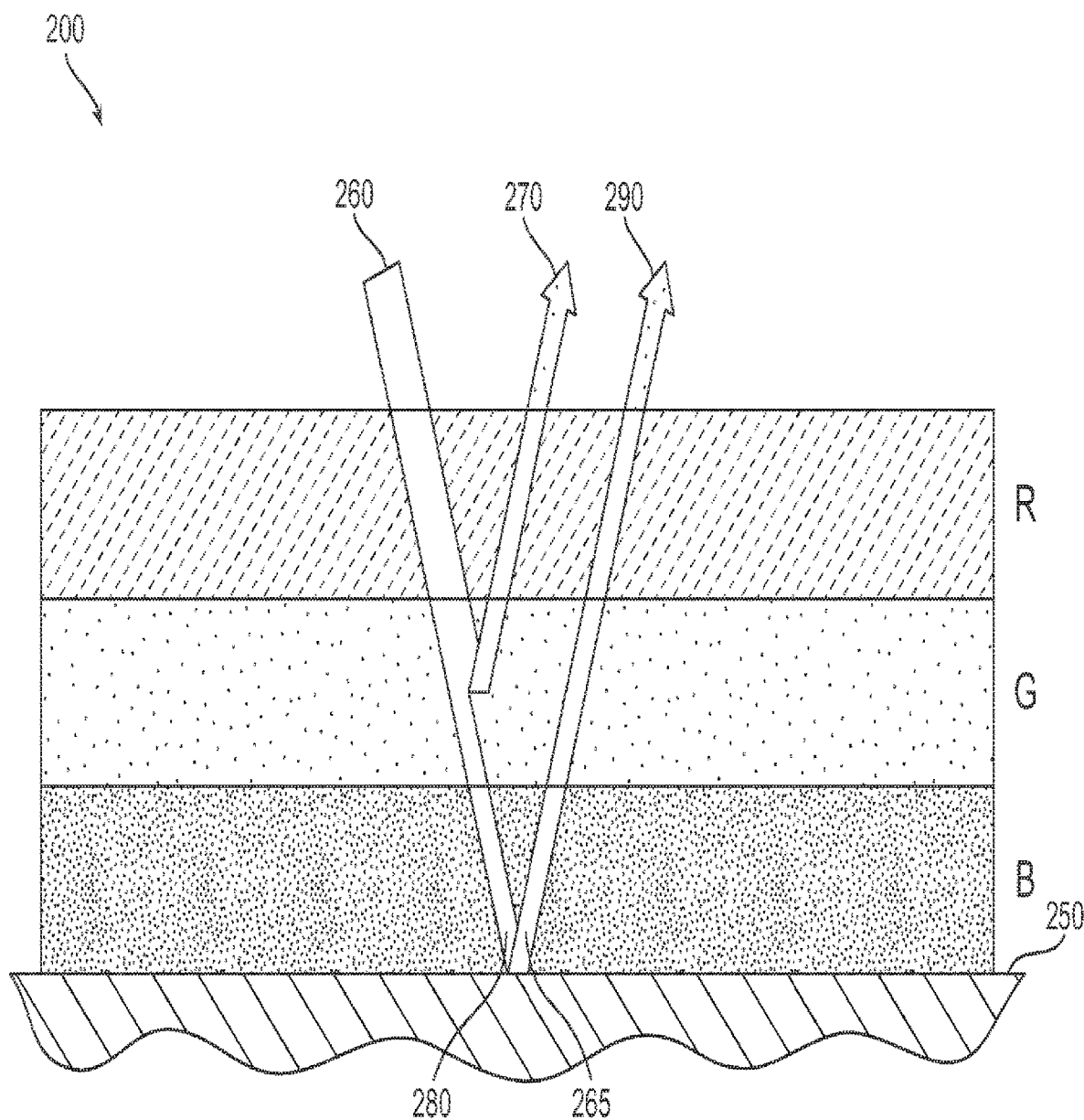
FIG. 2 is a schematic diagram of a subtractive color change system that may be an embodiment of this disclosure that exhibits green color.

FIG. 2 is a schematic diagram of an embodiment of a color change portion of a subtractive color change system as disclosed herein. In FIG. 2, the transparency of each color panel to the primary color of the panel is 50 percent, and the transparency of each color panel to color other than the primary color of the panel is essentially 100 percent. As illustrated in FIG. 2, color change portion 200 of a subtractive color change system includes color panel R, color panel G, color panel B, and background 250. Color panel R exhibits red color, color panel G exhibits green color, and color panel B exhibits blue color.

FIG. 2 illustrates an embodiment of a color change portion 200 of a subtractive color change system that exhibits the color green. Light 260 has a relatively full spectrum. Light 260 is incident upon and passes through color panel R and is incident on color panel G, where first reflected light 270 exhibits green color. First residual light 280 passes through color panel G and color panel B and reflects as first reflected residual light 265 from background 250. First reflected residual light 265 passes through color panel B, color panel G, and color panel R and exits as second reflected light 290. Second reflected light 290 reinforces the green color exhibited by first reflected light 270.

Figure 3:
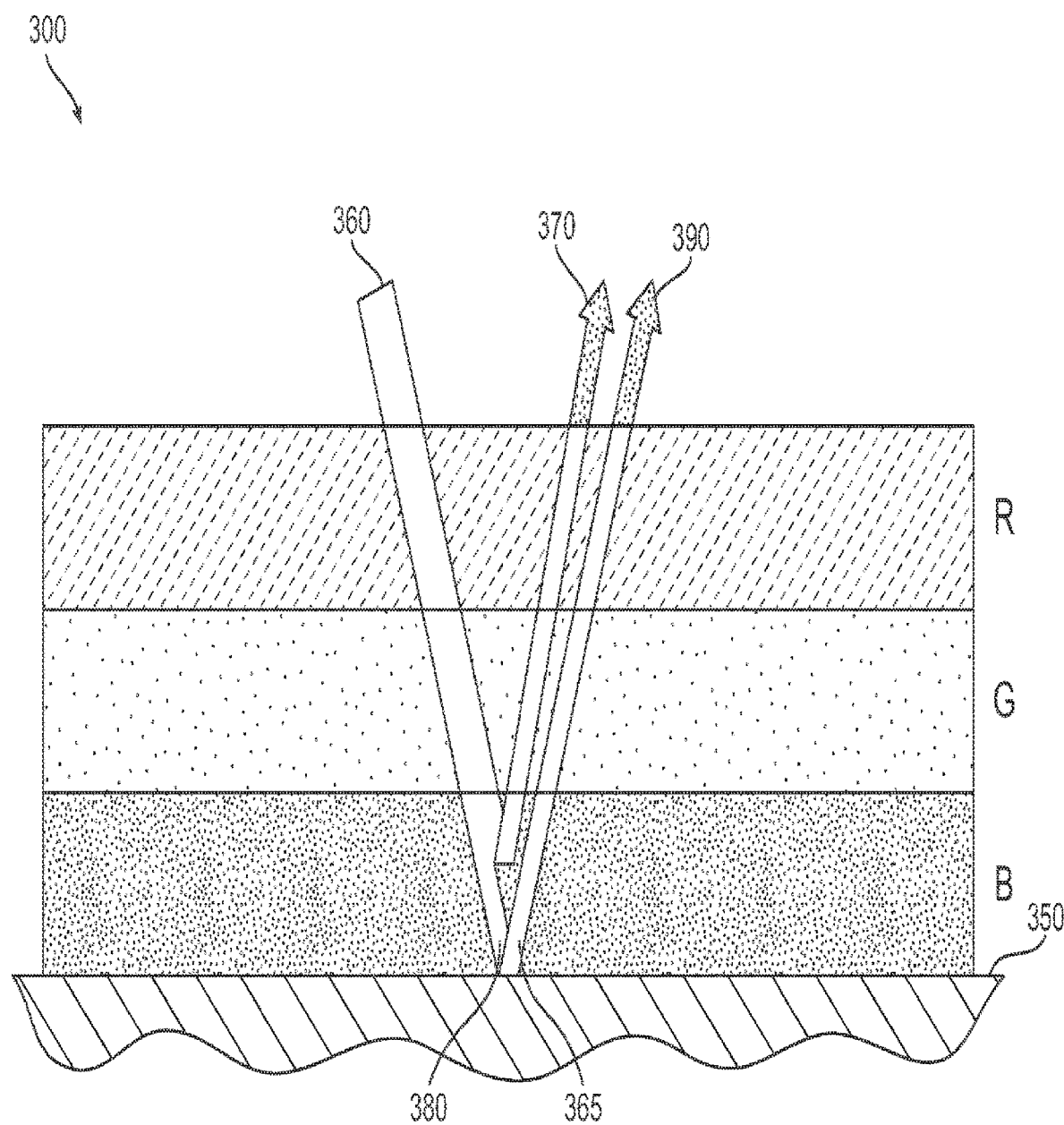
FIG. 3 is a schematic diagram of a subtractive color change system that may be an embodiment of this disclosure that exhibits blue color.

FIG. 3 is a schematic diagram of an embodiment of a color change portion 300 of a subtractive color change system as disclosed herein. In FIG. 3, the transparency of each color panel to the primary color of the panel is 50 percent, and the transparency of each color panel to color other than the primary color of the panel is essentially 100 percent. As illustrated in FIG. 3, subtractive color change system 300 includes color panel R, color panel G, color panel B, and background 350. Color panel R exhibits red color, color panel G exhibits green color, and color panel B exhibits blue color.

FIG. 3 illustrates an embodiment of a color change portion 300 of a subtractive color change system that exhibits the color blue. Light 360 has a relatively full spectrum. Light 360 is incident upon color panel R, where it passes through both color panel R and color panel G and is incident on color panel B. First reflected light 370 exhibits blue color. First residual light 380 passes through color panel B and is reflected from background 350 as first reflected residual light 365. First reflected residual light 365 passes through color panel B, color panel G, and color panel R, exits as second reflected light 390, and reinforces the blue color exhibited by first reflected light 370.

Figure 4:
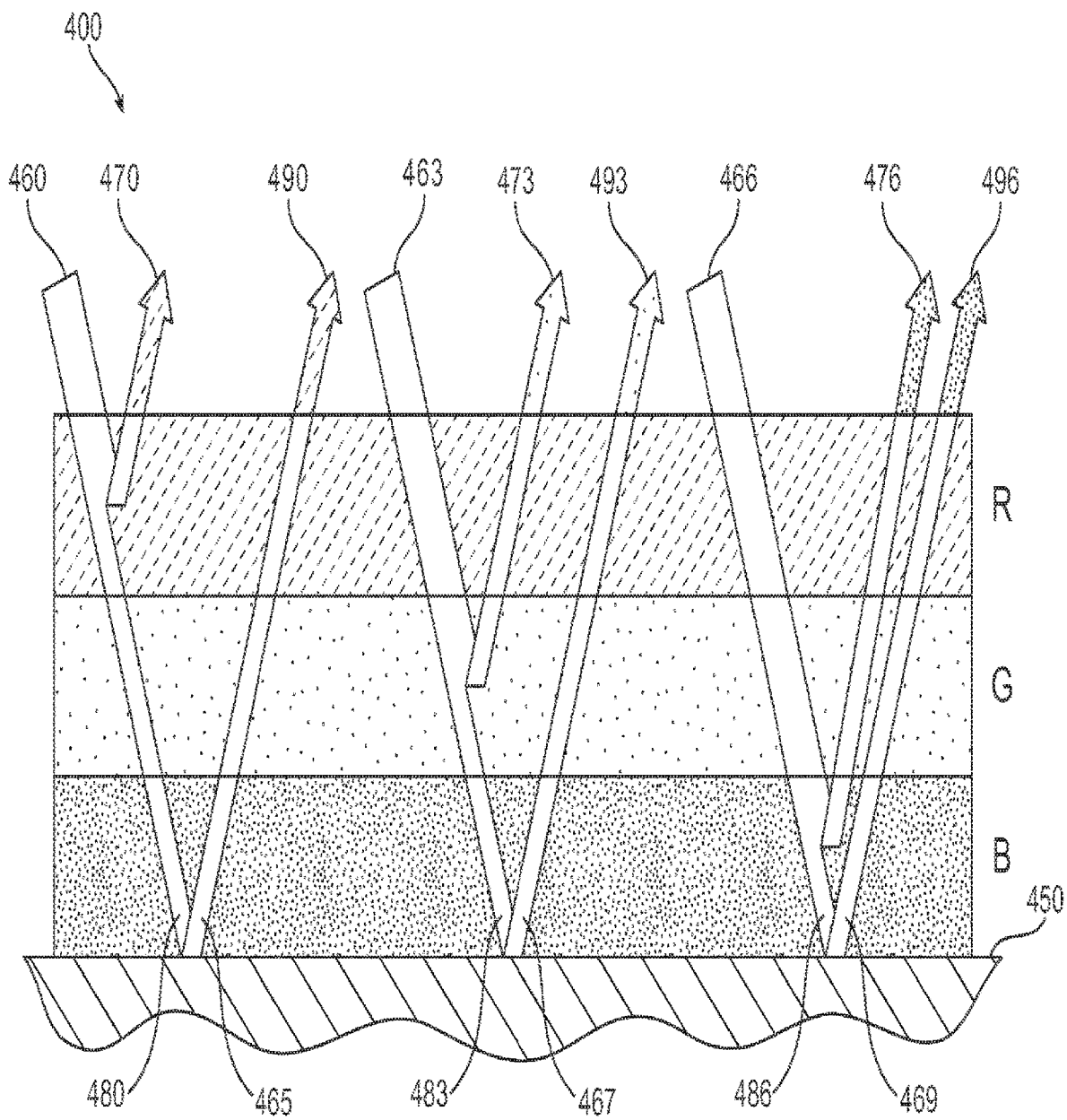
FIG. 4 is a schematic diagram of a subtractive color change system that may be an embodiment of this disclosure that exhibits a dark color, such as a muddy, indistinct black.

FIG. 4 is a schematic diagram of an embodiment of a color change portion 400 of a subtractive color change system as disclosed herein. In FIG. 4, the transparency of each color panel to the primary color of the panel is 50 percent, and the transparency of each color panel to color other than the primary color of the panel is essentially 100 percent. As illustrated in FIG. 4, subtractive color change system 400 includes color panel R, color panel G, color panel B, and background 450. Color panel R exhibits red color, color panel G exhibits green color, and color panel B exhibits blue color.

FIG. 4 illustrates an embodiment of a color change portion 400 of a subtractive color change system that exhibits the color black. Each of first light 460, second light 463, and third light 466 has a relatively full spectrum. First light 460, second light 463, and third light 466 are incident on color panel R, where first reflected light 470 exhibits red color. First residual light 480 passes through color panel R, color panel G, and color panel B, is reflected through color panel B, color panel G, and color panel R from background 450 as first reflected residual light 465, exits as second reflected light 490 and reinforces the red color exhibited by first reflected light 470.

Second light 463 passes through color panel R and is incident on color panel G. Second reflected light 473 exhibits green color, and second residual light 483 passes through color panel G and color panel B, is reflected by background 450 as third reflected residual light 467. Third reflected residual light 467 passes through color panel B, color panel G, and color panel R, and then exits as fourth reflected residual light 493 and reinforces the green color exhibited by second reflected light 473.

Third light 466 passes through color panel R and color panel G and is incident on color panel B. Third reflected light 476 exhibits green color, and third residual light 486 passes through color panel B, is reflected by background 450 as fifth reflected residual light 469. Fifth reflected residual light 469 passes through color panel B, color panel G, and color panel R, and then exits as six reflected residual light 496 and reinforces the blue color exhibited by third reflected light 476. The combination is perceived as a dark color, such as a muddy, indistinct black.

Figure 5:
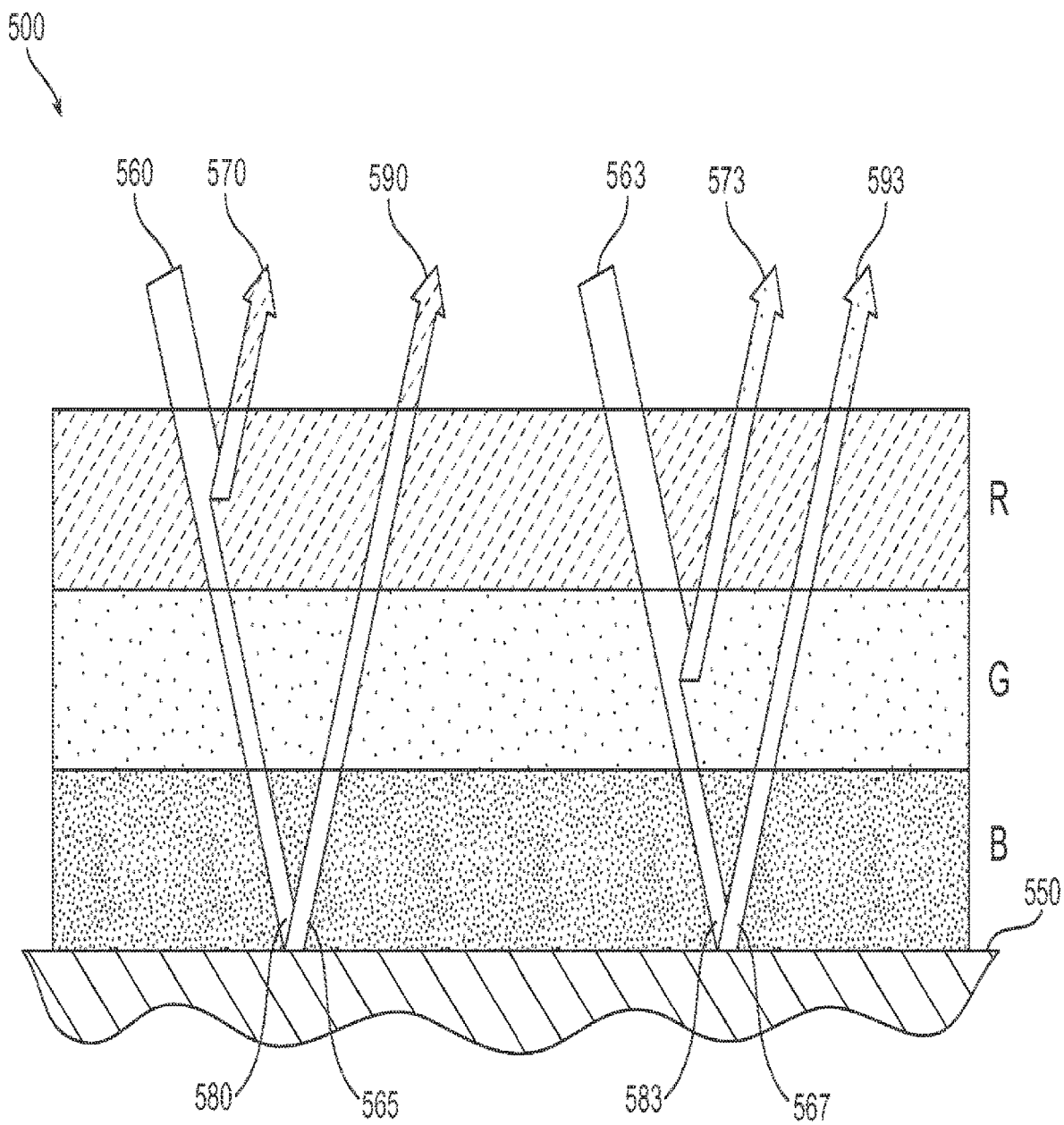
FIG. 5 is a schematic diagram of a subtractive color change system that may be an embodiment of this disclosure that exhibits brown color.

FIG. 5 is a schematic diagram of an embodiment of a color change portion 500 of a subtractive color change system as disclosed herein. In FIG. 5, the transparency of each color panel to the primary color of the panel is 50 percent, and the transparency of each color panel to color other than the primary color of the panel is essentially 100 percent. As illustrated in FIG. 5, subtractive color change system 500 includes color panel R, color panel G, color panel B, and background 550. Color panel R exhibits red color, color panel G exhibits green color, and color panel B exhibits blue color.

FIG. 5 illustrates an embodiment of a color change portion 500 of a subtractive color change system that exhibits the color brown. Each of first light 560 and second light 563 has a relatively full spectrum. First light 560 and second light 563 are incident on color panel R, where first reflected light 570 exhibits red color. First residual light 580 passes through color panel R, color panel G, and color panel B, is reflected through color panel B, color panel G, and color panel R from background 550 as first reflected residual light 565, exits as second reflected light 590 and reinforces the red color exhibited by first reflected light 570.

Second light 563 passes through color panel R and is incident on color panel G. Second reflected light 573 exhibits green color, and second residual light 583 passes through color panel G and color panel B, is reflected by background 550 as third reflected residual light 567. Third reflected residual light 567 passes through color panel B, color panel G, and color panel R, and then exits as fourth reflected residual light 593 and reinforces the green color exhibited by second reflected light 573. The resultant color is perceived as brown.

Figure 6:
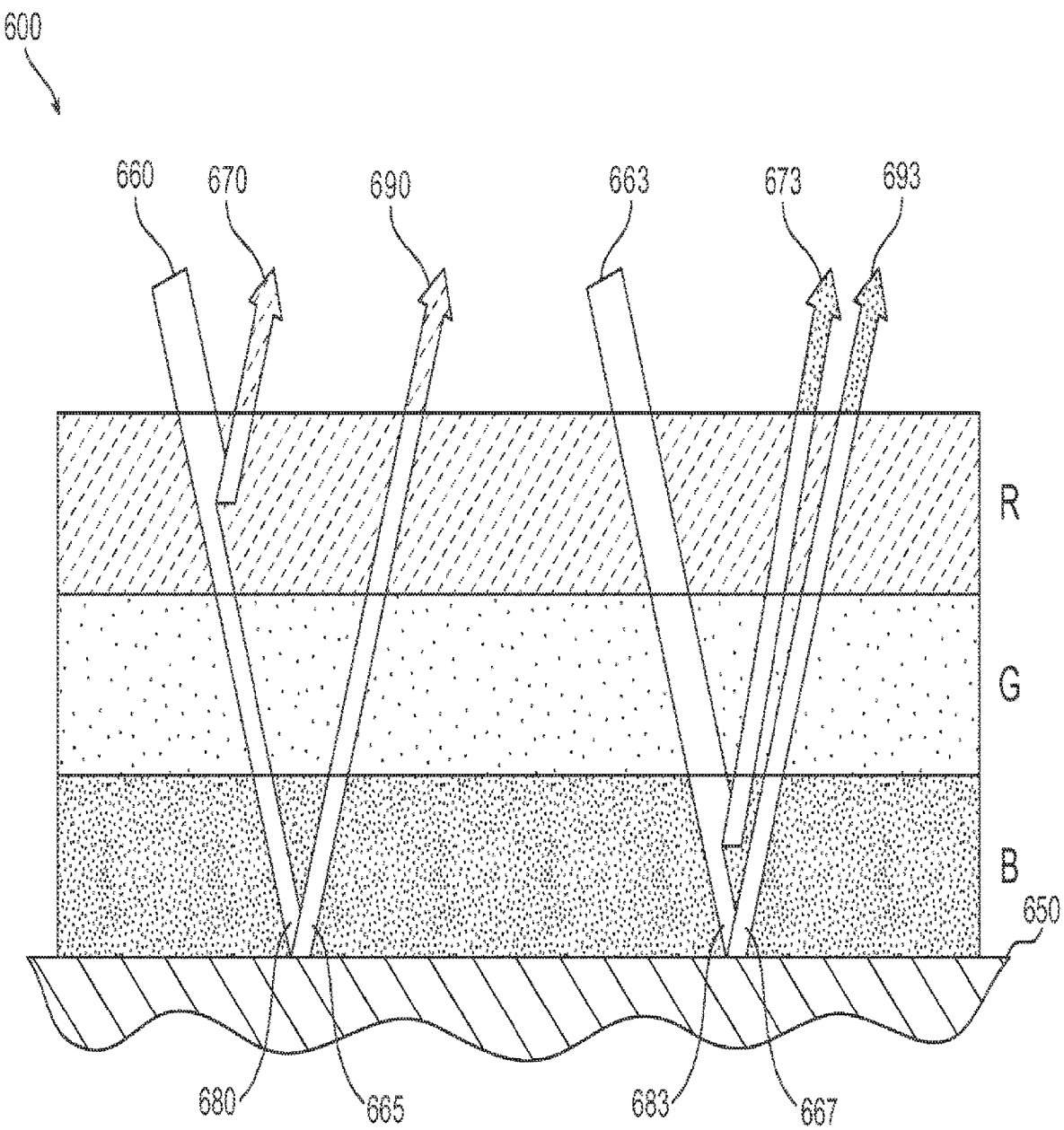
FIG. 6 is a schematic diagram of a subtractive color change system that may be an embodiment of this disclosure that exhibits purple color.

FIG. 6 is a schematic diagram of an embodiment of a color change portion 600 of a subtractive color change system as disclosed herein. In FIG. 6, the transparency of each color panel to the primary color of the panel is 50 percent, and the transparency of each color panel to color other than the primary color of the panel is essentially 100 percent. As illustrated in FIG. 6, subtractive color change system 600 includes color panel R, color panel G, color panel B, and background 650. Color panel R exhibits red color, color panel G exhibits green color, and color panel B exhibits blue color.

FIG. 6 illustrates an embodiment of a color change portion 600 of a subtractive color change system that exhibits the color purple. Each of first light 660 and second light 663 has a relatively full spectrum. First light 660 and second light 663 are incident on color panel R, where first reflected light 670 exhibits red color. First residual light 680 passes through color panel R, color panel G, and color panel B, is reflected through color panel B, color panel G, and color panel R from background 650 as first reflected residual light 665, exits as second reflected light 690 and reinforces the red color exhibited by first reflected light 670.

Second light 663 passes through color panel R and color panel B and is incident on color panel B. Second reflected light 673 exhibits blue color, and second residual light 683 passes through color panel B, is reflected by background 650 as third reflected residual light 667. Third reflected residual light 567 passes through color panel B, color panel G, and color panel R, and then exits as fourth reflected residual light 693 and reinforces the blue color exhibited by second reflected light 673. The resultant color is perceived as purple.

In embodiments of the disclosure, the key color is selected to aid in correction of differences between the color rendered and the color intended. For example, a fluorescent key color may add a vivid color that contributes to the intensity of the color and, perhaps, enhances the value. With the guidance provided herein, the user can select suitable colors for each of the panels without undue experimentation.

Figure 7:
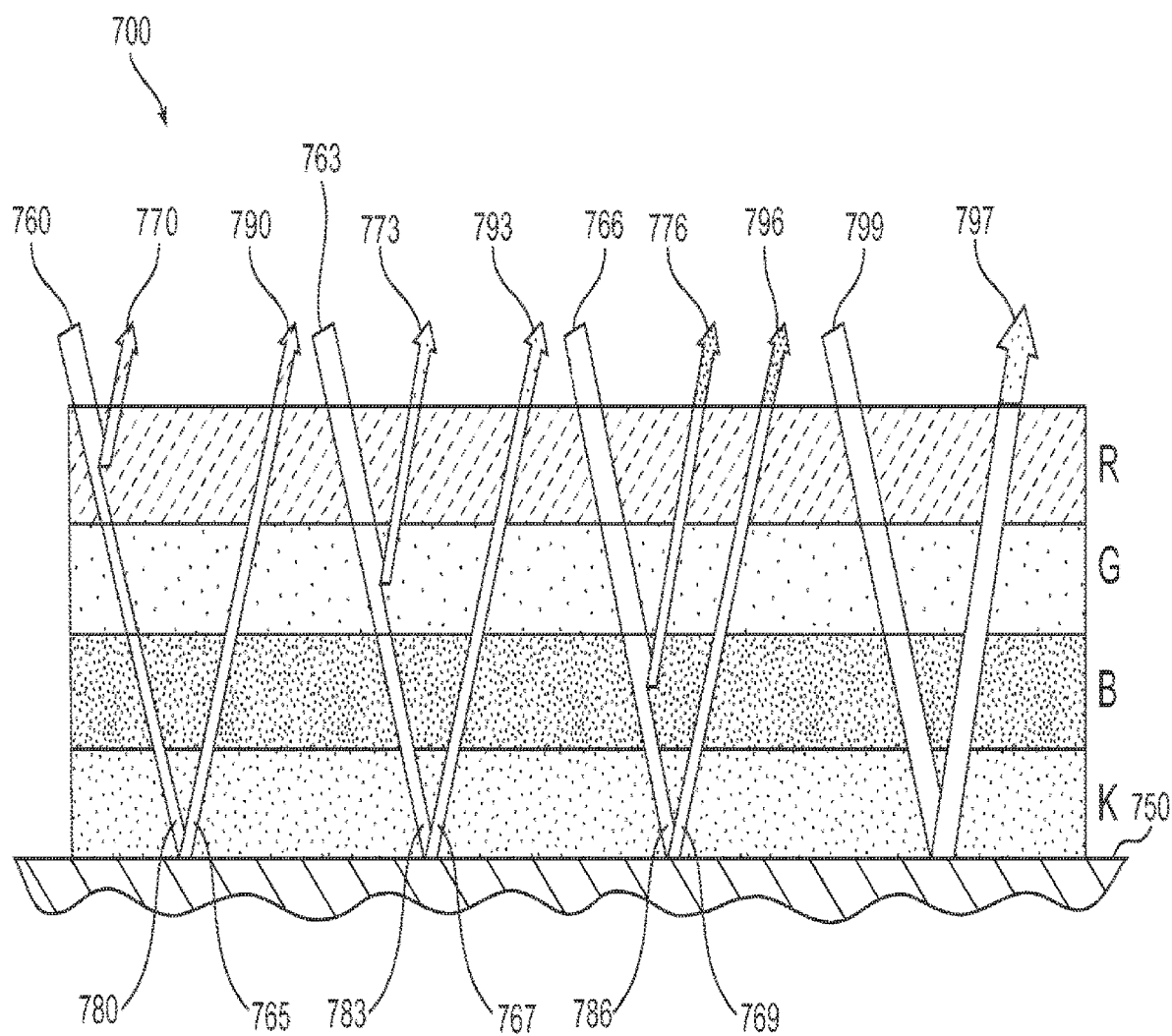
FIG. 7 is a schematic diagram of a subtractive color change system that may be an embodiment of this disclosure that exhibits a rich, satisfying black color that is typically darker than the muddy black color achieved in an embodiment illustrated in FIG. 4.

FIG. 7 is a schematic diagram of an embodiment of a color change portion 700 of a subtractive color change system as disclosed herein. In FIG. 7, the transparency of each color panel to the primary color of the panel is 50 percent, and the transparency of each color panel to color other than the primary color of the panel is essentially 100 percent. As illustrated in FIG. 7, subtractive color change system 700 includes color panel R, color panel G, color panel B, color panel K, and background 750. Color panel R exhibits red color, color panel G exhibits green color, color panel B exhibits blue color, and color panel K exhibits a key color.

FIG. 7 illustrates an embodiment of a color change portion 700 of a subtractive color change system that exhibits the color black. Each of first light 760, second light 763, third light 766, and fourth light 799 has a relatively full spectrum. First light 760, second light 763, third light 766, and fourth light 799 are incident on color panel R, where first reflected light 770 exhibits red color. First residual light 780 passes through color panel R, color panel G, color panel B, and color panel K, is reflected through color panel K, color panel B, color panel G, and color panel R from background 750 as first reflected residual light 765, exits as second reflected light 790, and reinforces the red color exhibited by first reflected light 770.

Second light 763 passes through color panel R and is incident on color panel G. Second reflected light 773 exhibits green color, and second residual light 783 passes through color panel G, color panel B, and color panel K, and is reflected by background 750 as third reflected residual light 767. Third reflected residual light 767 passes through color panel K, color panel B, color panel G, and color panel R, and then exits as fourth reflected residual light 793 and reinforces the green color exhibited by second reflected light 773.

Third light 766 passes through color panel R and color panel G and is incident on color panel B. Third reflected light 776 exhibits green color, and third residual light 786 passes through color panel B and color panel K, is reflected by background 750 as fifth reflected residual light 769. Fifth reflected residual light 469 passes through color panel K, color panel B, color panel G, and color panel R, and then exits as six reflected residual light 796 and reinforces the blue color exhibited by third reflected light 776.

Fourth light 799 passes through color panel R, color panel G, color panel B, and is incident on color panel K. Seventh reflected light 797 exhibits the key color. The combination is perceived as a rich, satisfying black.

In some embodiments, a portion of a subtractive color change system may be located on an upper of an article of footwear, and the remainder typically may be located on the inner side of the upper and within a sole structure, with appropriate electrical connections between the parts.

Embodiments of a subtractive color change system may include provisions for controlling a color change portion. In one embodiment, a color change system may include a control unit. In some embodiments, a control unit could be a central processing unit (CPU) of some kind. In other embodiments, a control unit could be a simple circuit of some kind for receiving electrical inputs and providing an electrical output according to the inputs. In one embodiment, a control unit may be a printed circuit board.

Embodiments of a control unit may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In an embodiment, a control unit can include a port for transmitting and/or receiving information from a color change portion. In addition, in some embodiments, the port may include provisions for transmitting power to and/or receiving power from the color change portion. A control unit also may include a second port for transmitting and/or receiving information from power storage device. In addition, in some embodiments, a second port may include provisions for transmitting power to and/or receiving power from the power storage device. In an exemplary embodiment, a control unit may control color changes in the color change portion using energy from the power storage unit. For example, in one embodiment, the control unit may send signals in the form of current changes and/or voltage changes to a color change portion to control the color of color change portion.

In embodiments of the disclosure, color panels are essentially transparent material and each renders a different color. These colors may be primary colors in a subtractive color space. In particular, the materials have adjustability of intensity and value in the color rendered. Adjustments or changes to intensity and value of each panel thus are made as is required by the material. For example, some materials effect change by application of electrical stimulation. For example, some materials change color, intensity, or value by electrical stimulation, whereas other materials change by change of pH, pressure, or another physical stimulus.

In embodiments of the disclosure, the panels comprise electrochromic compounds and polymers. In particular, embodiments of the disclosure comprise color panels containing one or more of electrochromic compounds and polymers, including but not limited to polymers containing thieno[3,4-b]thiophenes and/or thieno[3,4-b]furan monomeric units, polymer sulfonated poly(imides), polymer sulfonated poly(amic acids) and luminescent nucleic acid materials, as well as fibers, fabrics, materials and devices incorporating such compounds and polymers. Examples are disclosed in any of the following: Sotzing et al., U.S. Patent Application Publication Number 2011/0233532, Sep. 29, 2011; Sotzing, U.S. Patent Application Publication Number 2011/0201826, Aug. 18, 2011; Sotzing, U.S. Patent Application Publication Number 2011/0168951, Jul. 14, 2011; Sotzing et al., U.S. Patent Application Publication Number 2010/0288343, Nov. 18, 2010; Sotzing, U.S. Patent Application Publication Number 2010/0245971, Sep. 30, 2011; Sotzing, U.S. Patent Application Publication Number 2009/0326187, Dec. 31, 2009; Sotzing et al., U.S. Patent Application Publication Number 2009/0311799, Dec. 17, 2009; Sotzing et at, U.S. Patent Application Publication Number 2007/0191576, Aug. 16, 2007; Sotzing et al., U.S. Patent Application Publication Number 2007/0089845, Apr. 26, 2007; Sotzing, U.S. Pat. No. 7,951,902, May 31, 2011; Sotzing et al., U.S. Pat. No. 7,746,533, Jun. 29, 2010; Sotzing, U.S. Pat. No. 7,737,247, Jun. 15, 2010; Radmard et al., U.S. Pat. No. 7,626,748, Dec. 1, 2009; Radmard et al., U.S. Pat. No. 7,586,663, Sep. 8, 2009; Zahn et al., U.S. Pat. No. 7,572,879, Aug. 11, 2009; Zahn et al., U.S. Pat. No. 7,432,340, Oct. 7, 2008; Sotzing et al., U.S. Pat. No. 7,332,223, Feb. 19, 2008; Sotzing, U.S. Pat. No. 7,321,012, Jan. 22, 2008; Sotzing, U.S. Pat. No. 7,125,479, Oct. 24, 2006; Nordquist et al., U.S. Pat. No. 7,118,692, Oct. 20, 2006; Sotzing, U.S. Pat. No. 7,105,237, Sep. 19, 2006; Sotzing, U.S. Pat. No. 7,071,289, Jul. 4, 2006; and Lewis et al., U.S. Pat. No. 6,890,715, May 10, 2005; the entirety of each being hereby incorporated by reference.

In some embodiments, the color change system comprises electrochromic fiber or fabric, as described in Sotzing et al., U.S. Patent Application Publication Number 2010/0245971, Sep. 30, 2010, as incorporated by reference in its entirety above. The fiber or fabric may comprise a flexible, electrically conductive material that is coated or impregnated with an electrochromic material. In another embodiment, the fiber or fabric comprises a flexible, non-electrically conductive material that is rendered electrically conductive by coating or impregnating the non-electrically conductive material with electrically conductive material, which is subsequently coated with an electrochromic material.

When electrically conductive fibers are used, the fibers comprise an electrically conductive material, such as a metal, an electrically conductive organic material, or a combination thereof. Exemplary electrically conductive metals that can be formed into flexible fibers include silver, copper, gold, iron, iron alloy, aluminum, zinc, nickel, tin, and combinations comprising at least one of the foregoing metals. Exemplary electrically conductive organic materials that can be formed into flexible fibers include conjugated polymers such as poly(thiophene), poly(pyrrole), poly(aniline), poly(acetylene), poly(p-phenylenevinylene) (PPV), poly(3,4-ethylenedioxythiophene) poly(styrenesulfonate) (PEDOT-PSS), and similar materials.

When nonconductive fibers are used, the nonconductive fibers are coated or impregnated with a conductive material. Exemplary nonconductive fibers include those known for use in the manufacture of fabrics, including natural materials (e.g., cotton, silk, and wool) and synthetic organic polymers (e.g., poly(amide) (nylon), poly(ethylene), poly(ester), poly (acrylic), polyurethane (spandex), and poly(lactide). The coated fibers can be used as a fiber, or at least two coated fibers can be woven, knitted, crocheted, knotted, pressed, or plied to form a multi-filament fiber. It is also possible to have multiple nonconductive fibers formed into a yarn, and then coated with a conductive material. This construction can be used as a fiber, or be woven, knitted, crocheted, knotted, pressed, or plied to form a multi-filament fabric.

The electrically conductive fibers and fabrics (which as used herein include non-electrically conductive fibers rendered electrically conductive) are coated with an electrochromic material to provide an electrically conductive, electrochromic fiber. A wide variety of electrochromic materials are known and can be used, including inorganic materials such as transition metal oxides (e.g., vanadium, nickel, iridium, and tungsten oxide), fullerenes, Prussian blue (ferric ferricyanide); organometallic materials such as ferrocenes and ferrocenyl salts; and organic materials such as phthalocyanines, viologens, certain dyes, and conjugated polymers such as iodine-doped poly(acetylene), poly(thiophene), poly(phenylene), poly(phenylene sulfide), poly(pyrrole), and poly(aniline). Still other electrochromic materials are derived from silane precursors, norbornene precursors, and soluble conducting polymers. Desirable properties for the electrochromic polymer include a high degree of transparency in the visible color region in the "off" state (non-reduced or non-oxidized states, high absorption in visible spectral region upon electroreduction or electrooxidation ("on" state) (or in the case of multi-colored polymers, a high contrast between colored states), low electrochemical potential for reduction/oxidation, high stability in the "on" or "off" state (bi-stable), strong adsorption to the conductive fiber, color tunability by synthetic variation of the electrochromic precursor, low solubility of the electrochromic materials in common solvents, and low toxicity. Desirable electrochromic materials are those that undergo the highest contrast change upon oxidation or reduction, that is, from a colorless to a highly colored state, from a colored state to a colorless one, or from one colored state to another colored state upon oxidation and reduction.

In some embodiments, the electrochromic fibers and fabrics are further coated with an additional layer comprising an electrolyte material. In one embodiment the electrolyte material is a gel electrolyte. The gel electrolyte layer can be formed by coating a gel electrolyte precursor mixture comprising a gel electrolyte precursor. In particular, the gel precursor is a crosslinkable polymer. The gel electrolyte precursor mixture also comprises an electrolyte. The electrolyte can be an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (wherein Rf is a fluoroalkyl group), MOH, or combinations of the foregoing electrolytes.

In some embodiments, a method of forming a flexible, electrochromic fiber or fabric comprises disposing an electrochromic material on a surface of an electrically conductive fiber or fabric to form an electrochromic layer on the surface of the electrically conductive fiber or fabric. The method can further comprise disposing an electrolyte composition on the electrochromic layer to form the flexible, electrochromic fiber or fabric. In a specific embodiment, disposing the electrochromic material comprises disposing a monomeric electrochromic precursor, and polymerizing the electrochromic precursor to form a polymeric electrochromic layer on the surface of the electrically conductive fiber or fabric; and disposing the electrolyte comprises disposing a mixture comprising a gel precursor and an electrolyte on the polymeric electrochromic layer, and polymerizing the gel precursor to form the flexible, electrochromic fiber or fabric. A plurality of the flexible, electrochromic fibers can be used to form an electrochromic fabric by weaving or entangling the plurality of flexible, electrochromic fibers.

In some embodiments, a method of forming a flexible, electrochromic fiber or fabric comprises disposing an electrically conductive, electrochromic material onto a non-electrically conductive fiber or fabric to form an electrically conductive electrochromic fabric. The method can further comprise disposing an electrolyte composition on the electrically conductive, electrochromic layer to form the flexible, electrochromic fiber or fabric. The non-electrically conductive fiber or fabric comprises a natural or synthetic non-electrically conductive organic polymer, specifically an elastic material, for example spandex. A flexible, electrochromic fabric can be formed from a plurality of the flexible, electrochromic fibers by weaving or entangling the plurality of flexible, electrochromic fibers. The electrochromographic device comprising the electrochromic fibers or fabrics can be reversibly stretchable.

In some embodiments, the electrochromic fibers and fabrics are used as part of garments or shoes. The color change portion comprising the electrochromic fibers or fabrics can be the entire garment or shoe, or a portion of the garment or shoe. The color change portion comprising the electrochromic fibers or fabrics can further be an integral part of the garment or shoe, or a detachable portion of the garment or shoe. In some embodiments, the electrochromic fiber or fabric is used as the material for the upper of shoes. In further embodiments, the garment or shoes may comprise two or more color change portions. For example, the upper of a shoe may be a color change portion. Further, the same shoe may have additional distinct color change portions that are attached to or separate from the shoe upper. Still further, the sole and/or side walls of the sole may comprise electrochromic fiber or fabric. Each of the color change portions of the shoe, including the upper and sole, may comprise electrochromic fiber or fabric.

In some embodiments, the color change portion comprises one or more electrochromic fiber electrodes. In another embodiment the color change portion comprises a second electrochromic fiber electrode. The first electrochromic fiber electrode and the second fiber electrode can be independently electronically addressable. The first electrochromic fiber electrode and second electrochromic fiber electrode can each display the same color or a different visible color in response to an applied electrical potential.

Color change portions comprising electrochromic fibers or fabrics can display a still or animated color image.

In still another embodiment, a plurality of the electrochromic fibers can be used to manufacture a woven or nonwoven fabric wherein the individual electrochromic fibers are not independently addressed. In this embodiment, the fabric as a whole acts as a single addressable electrode. While these fabrics are generally in the form of a 2-dimensional woven or nonwoven planar sheet, their enhanced flexibility permits them to be shaped into 3-dimensional conformations such as a rolled sheet, a folded sheet, a twisted sheet, a coiled sheet, or other configuration.

While various embodiments of the invention have been described, the description is intended to be exemplary, rather than limiting and it will be apparent to those of ordinary skill in the art that many more embodiments and implementations are possible that are within the scope of the invention. For example, any combination of primary colors in a subtractive color space may be used, such as cyan, magenta, and yellow, red, yellow, and blue, or orange, green, and violet. Accordingly, the invention is not to be restricted except in light of the attached claims and their equivalents. Also, various modifications and changes may be made within the scope of the attached claims.

What is claimed is:

1. A wearable article, comprising:
   a background material having an interior surface configured to be worn proximate a body of a wearer of the wearable article and an exterior surface configured to be worn distal the body of the wearer;
   an electronic control unit; and
   a color change portion, secured to the exterior surface and operatively coupled to the electronic control unit, the color change portion comprising a plurality of panels each having a transparent portion coextensive with one another across a visible area of the color change portion, a first panel of the plurality of panels layered on the exterior surface and additional panels of the plurality of panels stacked on the first panel, each of the plurality of panels having a separately variable transparency;
   wherein the electronic control unit is configured to selectively induce a current through each of the plurality of panels to change the transparency of each of the plurality of panels independently and across a range of transparency intensity, wherein the current through each of the plurality of panels does not pass through another one of the plurality of panels, and wherein the transparency of each panel produces an adjustable rendered color of the color change portion;
   wherein the plurality of panels are comprised of at least one of: electrochromic compounds or electrochromic fibers.

2. The wearable article of claim 1, wherein the plurality of panels includes a first panel in proximate the exterior surface, a second panel, and a third panel, the second panel positioned between the first and third panels.

3. The wearable article of claim 2, wherein the first panel is variably transparent to blue, the second panel is variably transparent to green, and the third panel is variably transparent to red.

4. The wearable article of claim 3, wherein the exterior surface is transparent and further comprising a white background surface visible through the exterior surface.

5. The wearable article of claim 3, wherein the exterior surface is transparent and further comprising a fluorescent background surface visible through the exterior surface.

6. The wearable article of claim 1, wherein the adjustable rendered color is one of a spectrum of target colors.

7. A system, comprising:
   a background material having a major surface;
   an electronic control unit; and
   a color change portion, secured to the major surface and operatively coupled to the electronic control unit, the color change portion comprising a plurality of panels each having a transparent portion coextensive with one another across a visible area of the color change portion, a first panel of the plurality of panels layered on the exterior surface and additional panels of the plurality of panels stacked on the first panel, each of the plurality of panels having a separately variable transparency;
   wherein the electronic control unit is configured to selectively induce a current through each of the plurality of panels to change the transparency of each of the plurality of panels independently and across a range of transparency intensity, wherein the current through each of the plurality of panels does not pass through another one of the plurality of panels, and wherein the transparency of each panel produces an adjustable rendered color of the color change portion;
   wherein the plurality of panels are comprised of at least one of: electrochromic compounds or electrochromic fibers.

8. The system of claim 7, wherein the plurality of panels includes a first panel in proximate the major surface, a second panel, and a third panel, the second panel positioned between the first and third panels.

9. The system of claim 8, wherein the first panel is variably transparent to blue, the second panel is variably transparent to green, and the third panel is variably transparent to red.

10. The system of claim 9, wherein the exterior surface is transparent and further comprising a white background surface visible through the exterior surface.

11. The system of claim 9, wherein the exterior surface is transparent and further comprising a fluorescent background surface visible through the exterior surface.

12. The system of claim 7, wherein the adjustable rendered color is one of a spectrum of target colors.

13. A method of making a wearable article, comprising:
   obtaining a background material having an interior surface configured to be worn proximate a body of a wearer of the wearable article and an exterior surface configured to be worn distal the body of the wearer;
   obtaining an electronic control unit; and
   securing a color change portion to the exterior surface and operatively coupling the color change portion to the electronic control unit, the color change portion comprising a plurality of panels each having a transparent portion coextensive with one another across a visible area of the color change portion, a first panel of the plurality of panels layered on the exterior surface and additional panels of the plurality of panels stacked on the first panel, each of the plurality of panels having a separately variable transparency;
   wherein the electronic control unit is configured to selectively induce a current through each of the plurality of panels to change the transparency of each of the plurality of panels independently and across a range of transparency intensity, wherein the current through each of the plurality of panels does not pass through another one of the plurality of panels, and wherein the transparency of each panel produces an adjustable rendered color of the color change portion;
wherein the plurality of panels are comprised of at least one of: electrochromic compounds or electrochromic fibers.

14. The method of claim 13, wherein the plurality of panels includes a first panel in proximate the exterior surface, a second panel, and a third panel, the second panel positioned between the first and third panels.

15. The method of claim 14, wherein the first panel is variably transparent to blue, the second panel is variably transparent to green, and the third panel is variably transparent to red.

16. The method of claim 15, wherein the exterior surface is transparent and further comprising a white background surface visible through the exterior surface.

17. The method of claim 15, wherein the exterior surface is transparent and further comprising a fluorescent background surface visible through the exterior surface.

* * * * *

UNITED STATES PATENT AND TRADEMARK OFFICE
CERTIFICATE OF CORRECTION

PATENT NO. : 11,804,200 B2
APPLICATION NO. : 17/968100
DATED : October 31, 2023
INVENTOR(S) : N. Scot Hull It is certified that error appears in the above-identified patent and that said Letters Patent is hereby corrected as shown below:

On the Title Page

Page 3, in Column 1, Item (56) under "Other Publications", Line 20, delete "Subractive" and insert --Subtractive-- therefor Signed and Sealed this
Fifth Day of December, 2023

Katherine Kelly Vidal
*Director of the United States Patent and Trademark Office*